May 19, 1959
F. J. SMITH
2,887,205
PARKING METERS
Filed Nov. 25, 1953
2 Sheets-Sheet 1
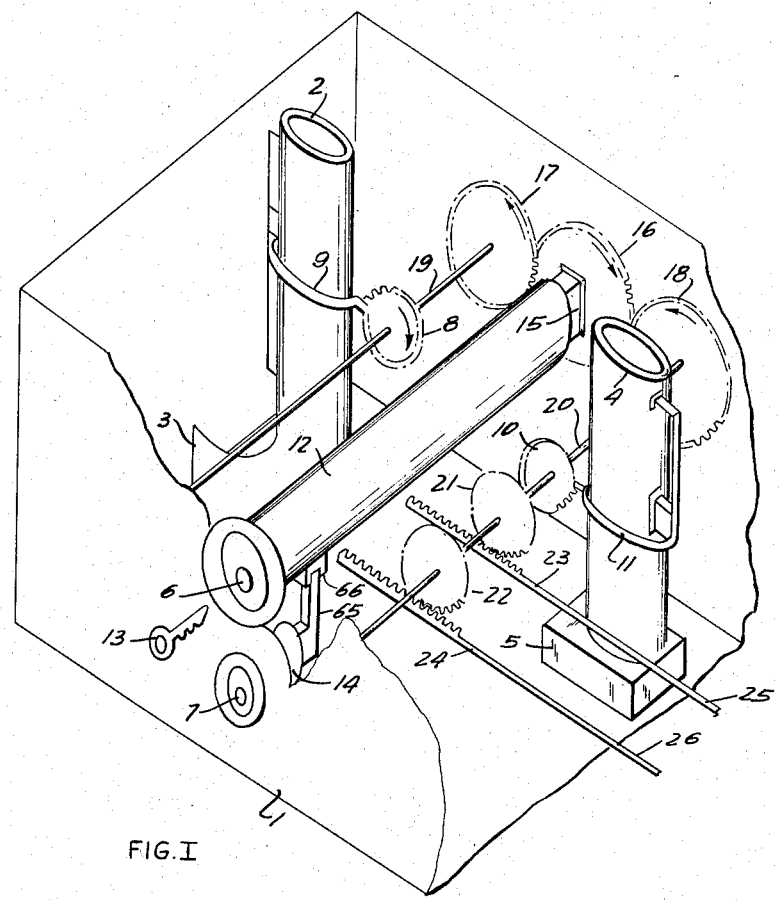
FIG. I
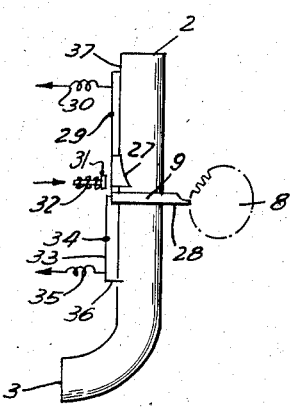
FIG. II A
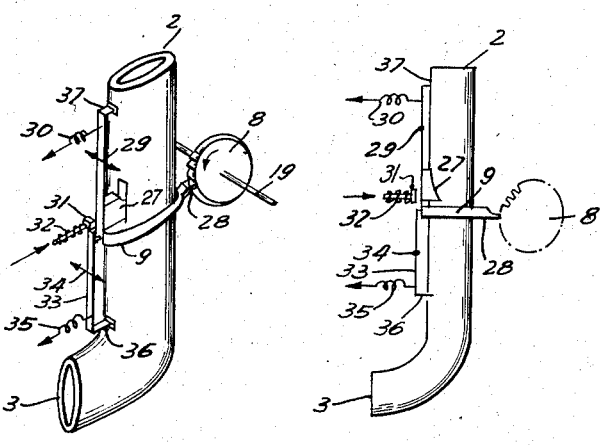
FIG. II B
*INVENTOR.*
BY *Frank J. Smith*

May 19, 1959 F. J. SMITH 2,887,205
PARKING METERS
Filed Nov. 25, 1953 2 Sheets-Sheet 2
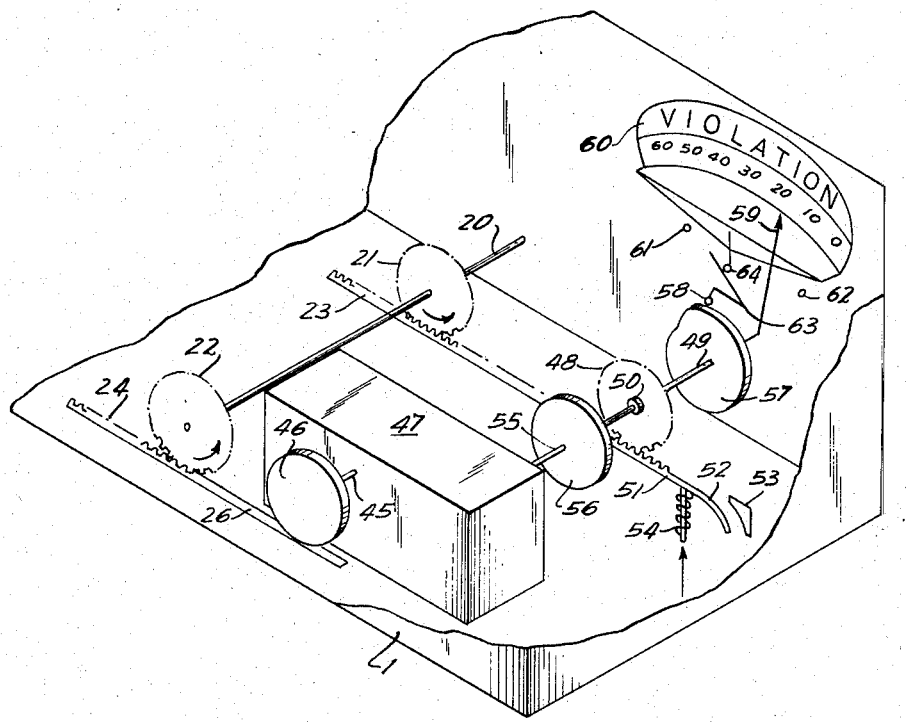
FIG. IV
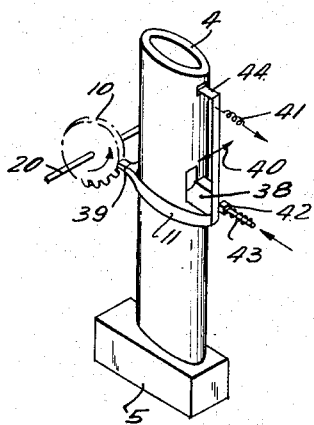
FIG. III A
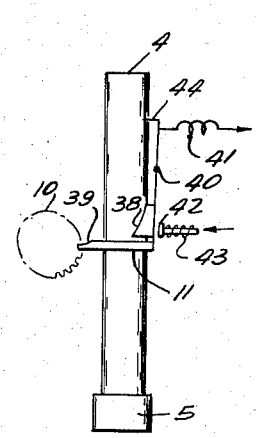
FIG. III B
INVENTOR.
BY Frank J. Smith

2,887,205
PARKING METERS

Frank J. Smith, Yonkers, N.Y.

Application November 25, 1953, Serial No. 394,292

16 Claims. (Cl. 194—19)

The invention pertains to a new and improved type of parking time meter, more specifically an improved device for measuring, controlling and regulating the parking of automobiles subject to established parking laws in effect where the meter is employed. For many years many municipalities or other lawful governing bodies have employed coin operated meters to regulate the parking of automobiles in busy or congested areas. Such meters have served the secondary purpose of renting parking space at a prescribed rate, thereby securing revenue for the governing authority. In general, such meters carry a "violation flag" which is automatically exposed at the expiration of the permitted parking time, thereby subjecting the motorist to a penalty fine if this violation is observed by a policeman. This feature is designed to cause a motorist (1) to return to his car at prescribed intervals for the insertion of new coins, thus resetting the meter for additional parking time or (2) to move his car from the congested area. The overall effect of the "violation flag" is, therefore, that of securing rapid turnover of parking space in the congested area, thus permitting a maximum number of motorists to enjoy the convenience of parking in such an area. This latter effect is, therefore, the primary purpose of parking meters as currently employed.

While it is true that the rental period may be varied in length as desired and that the coin required to operate the meter may be of any specified denomination, I have observed that whatever combination is employed, the secondary function, viz., the earning of revenue, is frequently thwarted by a careful observer. If, for instance, a first motorist pulls away from the parking space before the purchased time has expired, a second motorist can observe this free time on the meter and park his car without payment of a parking fee and with freedom from arrest. This process may be repeated by several motorists in turn so that it is not unusual to see 4 or 5 motorists parking on the fee paid only by the first of them. A study of this problem indicates that in an average busy area in which parking meters are employed, revenue could be increased 50% or more if each motorist were compelled to deposit a coin for the privilege of parking, regardless of the time required by the previous motorist who parked in the same place.

It is accordingly an object of my invention to provide a meter which will preserve the primary function described above and at the same time permit the collection of a maximum amount of revenue by requiring each motorist using the parking space to deposit the required parking fee. It is also an object of my invention to provide a new and improved parking meter comprising a time measuring device; a time indicating scale; a time indicator; an overtime, expired time, or violation indicating flag; an escrow coin accepting and refunding feature; a second coin accepting device covering the parking fee; a unique tumbler lock and key for operating the meter; and a second master keyed lock permitting the removal and replacement of the unique keyed lock assembly.

It is also an object of my invention to provide that both the escrow coin and the parking fee coin must be deposited before the meter can be operated and further that the escrow coin is automatically returned when the unique key is inserted into the lock and returned to its normal position occupied prior to use of the meter. It is also an object of my invention that the unique key is held fast in the tumbler lock in its normal unused position but that it is removable when turned to its used or parking position and further that insertion of the key and return to its normal unused position again locks the key fast in the lock, and further that the act of turning the key to its normal unused position in addition to refunding the escrow coin, removes all unused time from the parking meter, throws up the time expired or violation flag and also that this act makes the deposit of both a new escrow coin and a new parking fee coin necessary before the meter can again be used.

Having thus described in a general way the features of my invention, I will proceed to a detailed discussion of a typical embodiment thereof by the use of accompanying drawings in which:

Figure I is an isometric drawing of the complete assembly for controlling the meter coin accepting devices.

Figure IIa is an isometric drawing of the escrow coin accepting mechanism.

Figure IIb is an elevation drawing of the escrow coin accepting mechanism.

Figure IIIa is an isometric drawing of the parking fee coin accepting mechanism.

Figure IIIb is an elevation drawing of the parking fee coin accepting mechanism.

Figure IV is an isometric drawing of the timing and time registering mechanism.

Referring more particularly to the drawings, my parking meter consists of a spring wound time measuring device and related mechanism together with coin handling arrangements all encased in an outer meter case 1, of such size, design and appearance to permit protection from the elements and the use of the device in the normally accepted fashion of a parking meter.

The meter case contains an escrow coin slot 2, leading to a return slot 3, and a parking fee coin slot 4, leading to a meter coin box 5. In addition the meter case contains two key holes 6 and 7, and the customary window in which an unexpired time indicating scale or a parking violation flag is shown.

Referring to Figure I, the apparatus is shown in the normal unused position. It will be noted that cams 8 and 10, are prevented from rotating, and thereby setting the device in motion, by means of the extending arms of the swinging yokes 9 and 11, in contact therewith. In order to place the meter in operation, a coin of a specified denomination is placed in slot 2, and a similar or different denomination coin is placed in slot 4. The coins are held within the coin slots to be disposed of as later described but for the purpose of explanation, that coin deposited in slot 2 will be later referred to as the escrow coin while that coin deposited in slot 4 will be later referred to as the parking fee coin. As more clearly described later, the dropping of the coins in the respective slots causes the corresponding yoke extension bar to swing away from its related cam, thus permitting free rotation. It is evident, however, from an inspection of the drawing that both coins must be deposited and both yoke extension bars must be swung clear of its respective cam before any part of the mechanism may be operated.

It is intended that the lock assembly 12 be a high quality pin and tumbler lock of conventional design and that it be equipped with a serially numbered unique key 13 and that this serial number also be stamped on the lock cylinder barrel within the confines of the meter case.

It is further intended that the lock assembly 12 be quickly removable and that it be held securely in place by a second high quality pin and tumbler lock 14 of conventional design except that the key therefor may be mastered to fit many or all of the meters employed in a given area. The lock assembly 12 is constructed such that when the key thereto is in the upright position shown in Figure I, it cannot be removed from the lock, but that when the key is turned to the "in use" position it may be readily removed.

The meter is placed in operation by inserting the coins previously described and then turning key 13 in a clockwise direction as far as it will go, this distance being regulated by a suitable stop not pictured. Rotation of the key causes the inner cylinder of lock 12 to rotate and this motion is transmitted by the cylinder extension 15, to gear 16. Clockwise rotation of gear 16 causes counter-clockwise rotation of both gears 17 and 18 and also counter-clockwise rotation of shafts 19 and 20 each rigidly connected to its respective gear. It is evident that counter-clockwise rotation of shaft 20 will cause counter-clockwise rotation of gears 21 and 22 which are rigidly connected to said shaft and that this rotation will cause movement from left to right of the pinion bars 23 and 24 together with the bar extensions 25 and 26 rigidly fixed thereto. It is likewise evident that turning the key 13 in a counter-clockwise direction will reverse all of the action previously referred to and in an amount equal to the original displacement.

Referring to Figure IIa and Figure IIb, it will be seen that the mechanism is in a position corresponding to Figure I and previously described as the unused position. Insertion of the escrow coin in slot 2, causes swinging yoke 9 to move from right to left because of the design and shape of coin arresting block 27. It is noted, however, that the design and shape of this block is such that the escrow coin is temporarily held thereon. As the yoke is swung back, the yoke extension bar 28 is pulled away from cam 8, thus freeing the cam and making it possible for it to rotate in a counter-clockwise direction. It is noted that the intended action of the device is accomplished by pivoting the swinging yoke on pivot 29. When no coin is resting against the coin block, the yoke extension bar is held against the cam by means of a small spring 30. The weight of the escrow coin against the coin block, moves the yoke assembly from right to left until it is stopped by stop 31, held by spring 32. When the escrow coin is deposited and the cam rotated in counter-clockwise direction as previously described, the cam design and yoke extension bar design is such that for the most of the cam rotation cycle there is no engagement of the two. Near the end of the cam rotation limit, however, the cam contacts the yoke extension bar, forcefully pushes it further from right to left, thus pushing back stop block 31 and dropping the escrow coin away from arresting block 27. It is noted, however, that as the yoke moves from right to left, it engages a second coin arresting mechanism 33, pivoted at point 34 and held firm in contact with the swinging yoke by means of spring 35. It is evident that as the escrow coin is released from the coin arresting block 27, it is caught by extension 36 of bent bar 33 and that it will be held in this position until cam 8 is rotated in a clockwise direction and the entire mechanism reversed to its original starting position. Such action will release the escrow coin and drop it into the escrow coin return slot 3 where it may be recovered.

Inspection of Figure IIa and Figure IIb, will indicate that as a related action, when the swinging yoke 9 is moved from right to left, bent bar extension 37 moves from left to right thus preventing the insertion of a second escrow coin until the first coin has been cleared from the mechanism. This is an important feature as later described. It will likewise be observed that once the coin has been dropped away from the arresting block 27 in the manner described, the swinging yoke extension bar 28 will be held in contact with cam 8 at all times thus making possible rotation of cam 8 only in a clockwise direction because of the presence of suitably arranged stop notches in the periphery of cam 8.

Referring to Figure IIIa and Figure IIIb, it will be seen that the mechanism is in a position corresponding to Figure I and previously described as the unused position. Insertion of the parking fee coin into slot 4, causes swinging yoke 11 to move from left to right because of the design and shape of coin arresting block 38. It is noted, however, that the design and shape of this block is such that the parking fee coin is held temporarily thereon. As the yoke is swung back, the yoke extension bar 39 is pulled away from cam 10, thus making it possible for it to rotate in a counter-clockwise direction. It is noted that the intended action of the device is accomplished by pivoting the swinging yoke on pivot 40. When no coin is resting against the coin arresting block, the yoke extension bar is held against the cam by means of a small spring 41. The weight of the parking fee coin against the coin arresting block moves the yoke assembly from left to right until it is stopped by stop 42 held by spring 43. When the parking fee coin is deposited and the cam rotated in a counter-clockwise direction as previously described, the cam design and yoke extension bar design is such that for the most of the cam rotation cycle there is no engagement of the two. Near the end of the cam rotation limit, however, the cam contacts the yoke extension bar 39, forcefully pushes it further from left to right thus pushing back to the stop block 42 and dropping the parking fee coin into the coin box 5 below for later collection by the proper authority.

Inspection of Figure IIIa and Figure IIIb will indicate that as a related action, when the swinging yoke 11 is moved from left to right, bent bar extension 44 moves from right to left, thus preventing the insertion of a second parking fee coin. It will likewise be observed that once the parking fee coin has been dropped away from the coin arresting block in the manner described, the swinging yoke extension bar 39 will be held against cam 10 at all times, thus making possible rotation of cam 10 in a clockwise direction only, because of the presence of suitably arranged stop notches in the periphery of cam 10.

Referring to Figure IV, it will be seen that by the actions previously described on Figures I, IIa, IIb, IIIa and IIIb, a desired interlocked and controlled motion of pinion bar extensions 25 and 26 has been effected. Thus, rotation of key 13, Figure I, in a clockwise direction will move bars 25 and 26 from left to right and the reverse motion of the key will reverse the bar motion.

It is my intention that bar 26 will drive shaft 45 through engagement with a suitable friction clutch or motion release device 46. Shaft 45 will in turn be connected to the spring winding mechanism of any standard clock timing device 47. In this fashion, each normal operation of the parking meter will contribute to winding the spring driven timing clock, but overwinding will be prevented by the friction clutch and motion release device previously referred to. Reverse motion of bar 26 from right to left can be effected by application of the familiar ratchet mechanism employed on stem wound watches, built into the clock winding mechanism.

Similarly as bar 25 is moved from left to right in normal operation of the meter, it will move gear 48 in a counter-clockwise motion by virtue of the rack and pinion relation shown. It is to be noted that gear 48 is not rigidly attached to shaft 49 but that it is held by a friction grip 50 adjusted so as to hold tightly to the shaft but to permit rotation of gear 48 independent of shaft 49 when forced to do so. It is further noted that pinion bar 51 extension has a curved guide section 52 and accompanying guide block 53 so arranged as to permit pinion bar extension engagement with gear 48 throughout most of its lateral motion but also to lower bar 51 against the tension of spring 54 at the extreme right hand position of its travel sufficiently to disengage gear 48. The timing mechanism 47 drives shaft 55 in a clockwise direction. This motion is transmitted through clutch 56 and into shaft 49. Clutch 56 is designed to slip under less torque than is friction grip 50 but is likewise designed to secure non-slip connection to shaft 49, when pinion bar 51 is lowered away from gear 48 in the manner previously described. It will be observed that shaft 49 carries a cam 57 and cam following device 58 and that the shaft terminates in a right angle bend forming a pointer 59 moving across a time indicating scale 60, and that this pointer can move only through the desired arc as regulated by stops 61 and 62. The cam following mechanism is pivoted at 63 and in turn has a related following mechanism 64 designed to transfer the arc motion of the cam following mechanism into vertical motion. This follower 64 is attached rigidly to a combination time indicating scale and violation flag 60. This combination time indicating scale and violation flag appears behind the previously mentioned window in the meter case, but it is noted that this window is of such size that only the upper half or the lower half of the combination time indicating scale and violation flag is visible at any one time.

For purposes of better illustration, Figure IV has been arranged with the mechanism in normal operating cycle and with part of the purchased parking time used up and it is, therefore, evident that the position of the mechanism in Figures I, IIa, IIb, IIIa and IIIb, does not correspond to the position of the mechanism in Figure IV. The position of cam 57, which is rigidly fixed to shaft 49 is such that when shaft 49 is rotated in a clockwise direction, the cam following mechanism will drop over the "hump" at the instant that the indicating pointer reaches zero on the time indicating scale. This action will drop the combination time indicating scale and violation flag exposing the violation flag in the meter case window. Similarly when the shaft 49 is rotated in a counter-clockwise direction, the action will be reversed and the time indicating scale will be exposed. It is at once evident that turning of shaft 49 in a counter-clockwise direction can be effected only by key 13, Figure I, being moved in a clockwise direction as previously described; whereas rotation of shaft 49 in a clockwise direction can be effected either by turning key 13, Figure I, in a counter-clockwise direction as previously described or by the normal rotation of the timing clock shaft 55 transmitted through clutch 56.

Having thus described in detail the essential related mechanism of my invention I wish now to describe the overall manner of its use and application, the better to illustrate its distinctive and novel features.

Assuming that the mechanism is in its unused position, as illustrated in Figures I, IIa, IIb, IIIa and IIIb, a motorist desiring to park in the area controlled by the meter, deposits an escrow coin of the proper denomination in slot 2 and a parking fee coin also of the proper denomination in slot 4. He then turns key 13 as far in a clockwise direction as it will go, removes it from the meter and carries it on his person. The action of turning the key causes related actions as previously detailed, viz., the escrow coin to drop against stop 36, the parking fee coin to drop into the coin box, shaft 26 to move from left to right winding the clock and shaft 25 to move from left to right slipping clutch 56 but turning shaft 49 in a counter-clockwise direction until the pointer is stopped by stop 61. At the same time the time indicating scale is raised giving a measure of unexpired parking time. Also as shaft 25 reaches the extreme right end of its motion, it is lowered by guide 53 away from gear 48, thus permitting clutch 56 to begin transferring the clockwise motion of clock shaft 55 to shaft 49.

One of several things may then ensue. In the first case the motorist may return early before the expiration of his purchased time. In the second case he may return after the expiration of his purchased parking time. In the third case he may return at either of these intervals having lost the key which he removed from the meter or he may drive away absent mindedly failing to return the key to the meter. Operation of the system under all such conditions will now be described.

In the first case, when the motorist returns, he inserts the unique key in the meter and turns it as far in a counter-clockwise direction as it will go. This causes shafts 25 and 26 to move from right to left, shaft 26 moving unrestricted by virtue of the ratchet motion previously described and shaft 25 moving unrestricted due to the combined action of slippage in clutch 56 after shaft 52 leaves guide block 53 and reengages gear 48 and the slippage of friction grip 50 after pointer 59 strikes stop 62. All of this action is seen to remove unexpired time from the meter and to throw up the violation flag, thus making it necessary for the next motorist to purchase his own parking period irrespective of the portion of the time used by the previous motorist.

It is likewise evident that rotation of key 13 in a counter-clockwise manner to its limiting position causes both swinging yoke bar extensions to engage cams 8 and 10 as previously described and to lock the mechanism in an effective manner requiring the depositing again of both the escrow coin and the parking fee coin before the meter can again be placed in service. It is also evident that as a final related action, the escrow coin is returned to the motorist via slot 3, and bars 37 and 44 swing clear of their respective coin slots to permit depositing new coins.

In the second case, if the motorist returns after time purchased has been consumed, he will find the violation flag exposed in the customary manner and he may or may not have an overtime arrest notice depending on whether or not his violation has been observed by the governing police. In any case, he places the unique key in the meter, turns it in a counter-clockwise fashion as before as far as it will go. This action causes a sequence of events exactly as in the first case, except that all movement of bar 25 from right to left will be permitted as the result of slippage at friction grip 50 on shaft 49 and that none of it will be occasioned by slippage of clutch 56. In any event, the escrow coin will be returned to the motorist and the meter will be ready for a new motorist in the same fashion as previously described.

In the third case, it is assumed that either as a result of loss or negligence the motorist drives away without reinserting the key in the meter. Two variations of this case may arise, one in which there is unexpired time on the meter and the other in which the time is completely expired. In either variation, however, the motorist has failed to recover the escrow coin which he deposited. Assuming for the first variation that there is unexpired time on the meter, a second motorist desiring to park may take advantage of this situation exactly as now commonly done and as described in the opening paragraphs of this specification, but it is to be noted that any such opportunist cannot be sure that the previous motorist will not shortly discover his mistake, return to the meter, insert his key for the purpose of recovering his escrow coin and in the process throw up the violation flag on the unsuspecting opportunist pictured, thus making him subject to arrest for overtime parking. It is believed that this fear, coupled with the infrequency at which this situation as described will arise will make loss of revenue via this manner insignificant. In any event, in every instance of the first variation, where a motorist drives away without replacement of the unique key, thus leaving unexpired time on the meter, this time will shortly be used up and the violation flag will appear. The first variation will thus always in a short time become identical with the second variation envisioned under the third case; viz., those instances where a motorist fails to replace the unique key and drives away either with or without an overtime penalty arrest and with the violation flag showing.

In the third case then, the meter is out of service and cannot be used by a subsequent motorist without danger of an immediate arrest since he has no way to erase the violation flag. It is to be noted, however, that by virtue of bent bars 37 and 44 as described in Figures IIa, IIb, IIIa and IIIb, the motorist is prevented from inserting money in the meter thereby losing it and likewise establishing a complaint against the meter authority.

An important further novel feature of my invention is now evident. The patrol officer normally assigned to watch for overtime parking and to issue arrest notices for such violation also observes all meters in unoccupied parking spaces to see whether the unique key is present or missing. To this end, it would be convenient but not necessary that this key be brightly colored or otherwise designed so as to permit its detection in a rapid glance by a mounted or motorized officer. When unoccupied meters from which the unique key is missing are observed, the patrol officer inserts a master key in keyhole 7 of lock 14, Figure I, and turns it in a clockwise direction, thus moving locking bar 65 out of locking groove 66. He then removes completely, cylinder lock 12, Figure I, in a manner evident from this sketch. He then inserts a new cylinder lock assembly together with its unique key into the meter, turns lock 14 by means of the master key in a counter-clockwise direction, thus locking the new cylinder lock 12 assembly in place. He then turns the new unique key 13 in a counter-clockwise direction in the normal manner, recovering the escrow coin for the police authority and placing the meter back in normal service.

It is noted that the cylinder lock assembly 12 has a serial number stamped on it from which a new key can be made, thus restoring the lock to service at a later date and in a different meter. Since this serial number is within the meter case, the possessor of the original key, whoever he may be, will find it worthless; so that a system can be set up encouraging the return of such keys to the police department, in which case they can be matched with the removed and keyless cylinder assemblies, or destroyed. In any event the recovery of the escrow coin will be sufficient compensation to cover the cost of providing the removed and keyless cylinder assemblies with appropriate keys.

I wish now to describe without drawings a useful modification of my invention. In this modification, the timing mechanism is manually wound by means of a key or other suitable device by an attendant regularly servicing the meter. In this application, that part of my preferred embodiment previously described, relating to the clock winding mechanism may be omitted. Similarly in this embodiment, the unique key may be arranged in its related lock in such a fashion that rotation of the key is not required to effect operation of the mechanism. Thus in this modification, the meter may be placed in operation by the simple act of dropping the required coins into the proper slots and withdrawing the unique key. Similarly the escrow coin may be returned, the time indicating scale reset to zero and the time expired violation flag thrown up by the act of reinserting the unique key in its lock and without turning it.

Similarly, in a still further modification of my invention, the escrow coin accepting and return device may be attached to any practical time measuring parking regulating meter. In such an embodiment, the action of inserting the escrow coin or the action of inserting the escrow coin and turning the unique key erases a time expired violation flag and permits the remaining part of the meter to function in the normally accepted manner. Similarly the reinsertion of the unique key or the reinsertion of the unique key and turning it to its "not in use" position, again exposes the time expired violation flag, returns the escrow coin, and by the action of a suitable linking mechanism erases all unused time from the time registering scale of the parking meter.

Similarly, in a still further modification of my invention, the escrow coin accepting and return device may be employed in any of the manners as previously described and likewise the related locks and mechanisms may be employed in any of the manners as previously described except that the escrow coin return mechanism may be designed so as to deposit the escrow coin permanently in the parking meter bank rather than returning it to the motorist in those instances where purchased parking time expires before the meter key is returned to the meter and the meter mechanism returned to its normal unused position.

It is understood that while the above description of the mechanisms have been presented in detail in order better to illustrate the novel features of my invention, it is not intended that this invention shall be limited to a device incorporating each and every operating part described but rather that my invention will cover modifications to depicted mechanisms or any other mechanism which will accomplish the same novel features embodied in this specification.

What I claim and desire to protect by Letters Patent is:

1. In a parking time meter having a timing mechanism, a visible time indicating scale, a pointer associated therewith, a time expired violation flag, a fee coin accepting means and means releasable by said fee coin for setting said pointer on said scale, the improvement comprising an escrow coin accepting means, a key operated locking means releasable partly by said escrow coin and partly by said fee coin, a linkage between said locking means and said violation flag causing said flag to disappear when said locking means is set in "unlocked" position after release by said escrow coin, a linkage between the locking means and the timing mechanism for actuating said mechanism, an escrow coin return and associated therewith a retaining means for said escrow coin and a linkage between said retaining means and said locking means, permitting said escrow coin to be returned when said locking means is set in "locked" position.

2. In a parking meter having a timing mechanism, a visible time indicating scale, a time indicator, a time expired violation flag and means actuated by a key-operated lock for energizing said timing mechanism and for resetting said time indicator, the improvement comprising said key operated lock for actuating said timing mechanism and for locking it in "Off-Park" position, an escrow coin deposit slot and coin channel leading therefrom to a part of an interlock mechanism for release of the key operated lock, a coin channel leading from the escrow coin channel part of the interlocking means to an escrow coin return slot, a fee coin channel leading from another part of the interlocking means to a meter coin box, means for releasing said fee coin from the interlocking means and into the said coin box when said key-operated lock is set in "Park" position, means for releasing said escrow coin from the interlocking means into escrow position in said escrow coin return channel when said key operated lock is set in "Park" position, means for retaining said escrow coin in said escrow return channel when said key is withdrawn from said key operated lock, means for releasing said escrow coin from said escrow position into said escrow coin return slot when said key is returned to said key operated lock and lock is set in "Off" position, means for locking said key in said lock when in the "Off" position and a second service key operated locking means retaining and releasing entire key operated assembly permitting replacement by another lock assembly without otherwise dismantling said meter.

3. In a parking time meter having a timing mechanism, a visible time indicating scale, a pointer associated therewith, a time expired violation flag, a fee coin accepting means and means responsive to said fee coin for adjusting said pointer with respect to said visible time indicating scale, the improvement comprising an escrow coin accepting means, a key operated locking means partially releasable by said escrow coin and partially releasable by said fee coin in said fee coin accepting means, a linkage between said locking means and said violation flag causing said flag to disappear when said locking means is set in "unlocked" position after release by said escrow coin, an escrow coin return and associated therewith a retaining means for said escrow coin and a linkage between said retaining means and said locking means permitting said escrow coin to be returned when said locking means is set in "locked" position and a further linkage between said locking means and said pointer which will release all unexpired time on said time indicating scale, returning it to "zero" when said locking means is set in "locked" position.

4. In a parking meter having a timing mechanism, a visible time indicating scale, a time expired violation flag and a means for energizing said timing mechanism for resetting a pointer on said time indicating scale, the improvement comprising a key operated lock for said timing mechanism releasably locking it in "Off-Park" position, an escrow coin accepting and retaining device, a parking fee coin accepting and banking device, means actuated by an accepted escrow coin and fee coin respectively for releasing the lock for movement and for releasing said key from said meter while meter is in use, means whereby said escrow coin is returned to the depositor by returning the lock to "Off-Park" position when said key is replaced in said meter when violation flag is not exposed, means whereby said key may be retained in said lock when said meter is not in use and a releasing means whereby said lock assembly may be replaced with another lock assembly without otherwise dismantling said meter.

5. In a parking meter having a timing mechanism, a visible time indicating scale, and a coin controlled time indicator, the improvement consisting of an arrangement designed to insure the collection of a parking fee from all users of controlled rented parking space, a signal flag indicating when parking time has expired, a key operated lock for said timing mechanism releasably locking it in "Off-Park" position, an escrow coin accepting and retaining device, a parking fee coin accepting and banking device, means actuated by an accepted escrow coin and fee coin respectively for releasing the lock whereby the lock may be moved and whereby the said key may be removed from said meter while meter is in use, means whereby said escrow coin is returned to the depositor when said key is replaced in said meter by moving the key to reset the indicator to zero time, means whereby said key is retained in said lock when said meter is not in use and a releasing means whereby said lock assembly may be replaced with another lock assembly without otherwise dismantling said meter.

6. In a parking meter having a timing mechanism and a visible time indicating scale, a time indicator, a time expired violation flag and a means for energizing said timing mechanism, the improvement comprising a key operated lock for said timing mechanism releasably locking it in "Off-Park" position, an interlock mechanism for releasing the key-operated lock, an escrow coin deposit slot and coin channel leading therefrom to a part of said mechanism, a coin channel leading from the escrow coin channel part of the interlock mechanism to an escrow coin return slot, a fee coin channel leading to a parking fee coin part of the interlock mechanism and thence to a meter coin box, means for releasing said parking fee coin from the interlock mechanism and into said coin box when said key operated lock is set in "Park" position, means for releasing said escrow coin from the interlocking means into escrow position in said escrow coin return channel when said key operated lock is returned to "Park" position, means for retaining said escrow coin in said escrow return channel when said key is withdrawn from said key operated lock, means for releasing said escrow coin from said escrow position into said escrow coin return slot when said key is returned to said key operated lock by returning the lock to "Off" position, means for locking said key in said lock when in "Off" position, a suitable linkage between key operated lock and time indicating scale whereby any unused parking time is removed from parking meter when said lock is turned to "Off" position, a suitable linkage between said key operated lock and said violation flag whereby said violation flag is removed from sight when said lock is turned to "Park" position and is again exposed to sight when said lock is again turned to "Off" position, and a second service key operated locking means for retaining and releasing entire key operated lock assembly permitting replacement by another lock assembly without otherwise dismantling said meter.

7. A parking time meter which comprises an escrow coin receiver, a movable lock assembly and a key therefor which can be withdrawn therefrom only when the lock assembly is released and moved from its locked position, an elapsed time indicator and a clock mechanism for driving it, a fee coin receiver, means controlled by the fee coin introduced into the fee coin receiver for limiting the movement of the elapsed time indicator when said movement is permitted by said locking means, means controlled by the escrow coin introduced into the escrow coin receiver and by the fee coin in the fee coin receiver for releasing the lock assembly from its locked position whereby the lock assembly may be moved by the key, means whereby movement of the lock assembly energizes to energize the clock mechanism, moves the elapsed time indicator to its permitted position, and permits the key to be withdrawn, a fee coin receptacle and means for discharging said coin into said receptacle, and means for returning the escrow coin from the escrow receiver by movement of said lock assembly by said key lock to locked position, said lock assembly being operatively connected with said indicator to insure return of the indicator to its zero position when the lock assembly is moved to locked position.

8. The parking meter of claim 7 which includes means for preventing insertion of an additional escrow coin into the escrow receiver after the lock assembly has been released until said lock assembly is returned to its locked position.

9. The parking meter of claim 7 which includes means for preventing the insertion of a fee coin in the coin receiver after the elapsed time indicator has been moved to its permitted position until the lock assembly has been turned to locked position and the escrow coin has been returned.

10. The parking meter of claim 7 which includes means for replacing said locking means without dismantling said meter.

11. A parking time meter which comprises a time measuring device, a time indicating scale, a time indicator, a violation indicating flag, an escrow coin acceptor, a fee coin acceptor, a key operated tumbler lock operatively connected to said time measuring device, time indicator, violation indicating flag and escrow coin acceptor, a master-keyed lock permitting removal and replacement of the tumbler lock, means actuated by an escrow coin and associated with said escrow coin acceptor together with means actuated by the fee coin and associated with the fee coin acceptor for releasing the tumbler lock and permitting rotation of said lock by its key to energize the time measuring device and set the time indicator, means associated with said fee coin acceptor for limiting the position of the time indicator, means for retaining said escrow coin in its acceptor until said tumbler lock is returned to locked position and for returning said escrow coin when the key is inserted in the tumbler lock and the latter is turned to locked position whereby the indicator is returned to its zero position and means for retaining the tumbler lock key in the tumbler lock when turned to locked position, whereby the act of turning the key to its unused position in addition to refunding the escrow coin removes all unused time from the parking meter, causes the violation flag to be exposed, and makes the deposit of both a new escrow coin and a new fee coin necessary before the meter can be used again.

12. A multiple-coin controlled meter which comprises a timing mechanism, a movable lock assembly, means for moving said assembly when the assembly is released for movement, an escrow coin receiver, a fee coin receiver, means operated by the escrow coin and the fee coin in their respective receivers for releasing the lock assembly and permitting movement thereof, means actuated by said movement for trapping the escrow coin in its acceptor, depositing the fee coin in a receiver and energizing the timing mechanism and means including a return slot for returning the escrow coin by moving the lock assembly from "on" to "off" position by said moving means, thereby locking the assembly against movement until both an escrow coin and a fee coin are thereafter introduced into their respective acceptors.

13. A multiple-coin controlled meter which comprises a time scale, timing mechanism, a pointer driven by said mechanism across the scale, a rotatable lock assembly, a key for rotating said lock assembly when the assembly is released for rotation, said key being movable and normally removed only when the assembly is rotated from "free" to "in use" position, an escrow coin inlet slot, a fee coin inlet slot, means operated by the escrow coin in its slot combined with means operated by the fee coin in its slot for releasing the lock assembly and permitting rotation thereof by said key, means actuated by said rotation for trapping the escrow coin in its slot, depositing the fee coin in a receiver, moving the pointer along the scale and energizing the timing mechanism and means including a return slot for returning the escrow coin when the lock assembly is moved from "in use" to "free" position by said key, thereby returning the pointer to zero time position and locking the assembly against rotation until both an escrow coin and a fee coin are thereafter introduced into their respective slots.

14. In a parking meter having a timing mechanism, a visible time indicating scale, a pointer associated therewith, a time expired violation flag, a parking fee coin accepting means and means releasable by said parking fee coin for setting said pointer on said scale, the improvement comprising an escrow coin accepting means, a key operated locking means releasable by said escrow coin, a linkage between said locking means and said means releasable by said parking fee coin which permits the latter means to be operated only when the said key operated locking means is set in unlocked position, an escrow coin return slot and associated therewith a retaining means for said escrow coin and a linkage between said retaining means and said locking means permitting said escrow coin to be returned when said locking means is set in locked position and a further linkage between said locking means and said pointer which will release all unexpired time on said time indicating scale returning pointer to zero thereby exposing said violation flag when said locking means is set in locked position.

15. In a parking meter comprising a timing mechanism, a time indicating scale, an associated pointer normally driven by said timing mechanism said pointer indicating unexpired time on said scale, a violation flag associated with the time indicating scale and the timing mechanism and so designed that when the pointer is returned to zero unexpired time the violation flag will be exhibited but will at other times be hidden from view, the improvement comprising a key operated lock which may be turned to a park position and to an off position, a mechanical linkage preventing movement of said pointer along said scale except when key operated lock is turned to park position, a mechanical linkage designed to return said pointer to zero unexpired time when key operated lock is turned to off position, and further having separate arrangements for accepting coins, the first being a parking fee coin purchasing time on said timing mechanism, a suitable slot depositing parking fee coin in the meter bank, means associated with the parking fee coin accepting arrangement for partially releasing a holding device preventing said lock from being turned to park position with key, the second being an escrow coin which is deposited in a second suitable slot having associated therewith means for completing release of said holding device and finally an escrow coin return slot and means for returning the escrow coin to the depositor when said lock using said key is turned to the off position.

16. A multiple coin controlled meter which comprises a timing mechanism, a movable lock assembly, means for moving said assembly when the assembly is released for movement, a fee coin accepting means and means releasable by said fee coin for setting said timing mechanism, an escrow coin accepting means embodying a means for releasing said movable lock assembly, a linkage between said releasing means and said means releasable by said fee coin which permits the latter means to be operated only when said movable lock assembly is set in unlocked position, an escrow coin return slot and associated therewith a retaining means for said escrow coin and a linkage between said retaining means and said movable lock assembly permitting said escrow coin to be returned when said lock assembly is set in locked position and a further linkage between said lock assembly and said timing mechanism which will return said timing mechanism to its original starting position when said lock assembly is set in locked position.

References Cited in the file of this patent

UNITED STATES PATENTS

| | | |
|---|---|---|
| 1,947,443 | Bargman | Feb. 20, 1934 |
| 2,228,396 | Martin | Jan. 14, 1941 |
| 2,261,649 | Jensen | Nov. 4, 1941 |
| 2,285,056 | Ruska | June 2, 1942 |
| 2,593,191 | Rockola | Apr. 15, 1952 |
| 2,618,371 | Broussard | Nov. 18, 1952 |

FOREIGN PATENTS

| | | |
|---|---|---|
| 661,352 | Germany | June 16, 1938 |